United States Patent [19]
Henderson et al.

[11] Patent Number: 5,022,056
[45] Date of Patent: Jun. 4, 1991

[54] METHOD AND STRUCTURE FOR DIGITAL PHASE SYNCHRONIZATION

[75] Inventors: Richard D. Henderson, Sunnyvale; Frederick K. Yin Leung, Cupertino, both of Calif.

[73] Assignee: National Semiconductor Corporation, Santa Clara, Calif.

[21] Appl. No.: 425,796

[22] Filed: Oct. 23, 1989

[51] Int. Cl.$^5$ .............................................. H03D 3/24
[52] U.S. Cl. .................................. 375/119; 370/108; 328/72
[58] Field of Search ....................... 375/110, 119, 120; 328/72, 155, 75, 151; 307/352, 353, 358, 359, 511, 518, 523; 370/105.3, 108

[56] References Cited

U.S. PATENT DOCUMENTS

| | | | |
|---|---|---|---|
| 3,423,534 | 1/1969 | Pan | 375/118 |
| 3,440,547 | 4/1969 | Houcke | 375/119 |
| 3,908,084 | 9/1975 | Wiley | 375/119 |
| 4,010,323 | 3/1977 | Peck | 375/119 |
| 4,012,598 | 3/1977 | Wiley | 328/72 |
| 4,229,824 | 11/1980 | En | 328/155 |
| 4,359,770 | 11/1982 | Suzuka | 370/108 |
| 4,617,679 | 10/1986 | Brooks | 307/262 |
| 4,627,080 | 12/1986 | Debus, Jr. | 375/110 |
| 4,672,639 | 6/1987 | Tanabe et al. | 375/118 |
| 4,821,296 | 4/1988 | Cordell | 375/110 |
| 4,860,323 | 8/1988 | Malter | 375/111 |

OTHER PUBLICATIONS

"Advanced Peripherals", Mass Storage Handbook, 1988 Edition, Rev. 2.

Primary Examiner—Stephen Chin
Attorney, Agent, or Firm—Steven F. Caserza; Lee Patch

[57] ABSTRACT

A novel method and structure is taught for synchronizing a received digital data stream to the receiver clock. A plurality of delay lines; are used to provide a plurality of delayed input signals, which are then compared with the receiver clock signal in order to determine which of the delayed input signals is closest in phase to the receiver clock signal. Once this determination is made, a multiplexer is used to select the appropriate one of the plurality of delayed input signals for use by the receiver. In an alternative embodiment, a plurality of delay lines are used to provide a plurality of delayed clock signals, which are then compared with the receiver input signal in order to determine which of the delayed clock signals is closest in phase to the receiver input signal. Once this determination is made, a multiplexer is used to select the appropriate one of the plurality of delayed clock signals for use by the receiver.

19 Claims, 5 Drawing Sheets

METHOD AND STRUCTURE FOR DIGITAL PHASE SYNCHRONIZATION

INTRODUCTION

Background

This invention pertains to electronic circuits and methods for use in phase synchronization of digital signals. This invention is particularly useful in synchronizing the phase of a received signal of known frequency, for example, on the receiving end of the communication link.

DESCRIPTION OF THE PRIOR ART

It is well known in the art to transmit digital signals, for example over a digital bus using TTL or RS-232 levels, or over a communications link such as a radio frequency channel or an optical fiber. In order to recover received data accurately, it is important to know the clock frequency of the transmitted data. This can be accomplished, for example, by using a highly stable crystal controlled clock of known frequency in the transmitter, and a similar highly accurate crystal controlled clock of the same frequency in the receiver. In this event, the frequencies are equal, although the phase of the received data stream with respect to the receiver clock cannot be guaranteed because the transmitter clock and the receiver clock are not phase controlled.

A typical prior art structure for ensuring phase synchronization of the received data signal to the receiver clock is to use a phase lock loop. Using a phase lock loop requires a training sequence consisting of a number of non-data pulses in order to achieve phase lock. This overhead reduces the effective bit rate of the communication channel. Furthermore, a phase lock loop requires a large loop gain stabilization capacitor which typically cannot be formed on an integrated circuit device. Phase lock loops also require a fair amount of circuitry, much of it analog, which is difficult to design and implement with the necessary precision and stability. Such analog circuitry is particularly not easy to implement in CMOS integrated circuits, which are desirable for very low power consumption.

Phase lock loops are described, for example, in "Analysis and Design of Analog Integrated Circuits", Gray and Meyer, particularly pages 575-603, John Wiley and Sons, Second Edition (1984). Another prior art description of phase lock loops is National Semiconductor Mass Storage Data Book, Application Note AN-413 entitled "Disk Drive Separator Overview", pages 1-36 through 1-48.

Other prior art techniques to quickly provide phase synchronization with an incoming signal is to use a very high frequency clock. However, this has severe drawbacks in being expensive and difficult to maintain a reliable very high frequency clock.

SUMMARY

In accordance with the teachings of this invention, a novel method and structure is taught for synchronizing a received digital data stream to the receiver clock. A plurality of delay means, such as digital delay strings which have no absolute accuracy requirement, are used to provide a plurality of delayed input signals, which are then compared with the receiver clock signal in order to determine which of the delayed input signals is closest in phase to the receiver clock signal. In combination with this determination, the appropriate one of the plurality of delayed input signals is selected for use by the receiver and, in a preferred embodiment, in such a way that metastability is logically avoided at the sample time.

In an alternative embodiment of this invention, a plurality of delay means, such as digital delay strings which have no absolute accuracy requirement, are used to provide a plurality of delayed clock signals, which are then compared with the receiver input signal in order to determine which of the delayed clock signals is closest in phase to the receiver input signal. Once this determination is made, a multiplexer is used to select the appropriate one of the plurality of delayed clock signals for use by the receiver.

Thus, the phase between the receiver and transmitter is made coherent without the need for feedback from the transmitter to the receiver to make the receiver and transmitter clocks coherent, without the need for a phase lock loop in the receiver, without the need for an extremely high frequency clock, and without the need for an accurate delay line. In a preferred embodiment, metastability is logically avoided.

DETAILED DESCRIPTION

Figure 1:
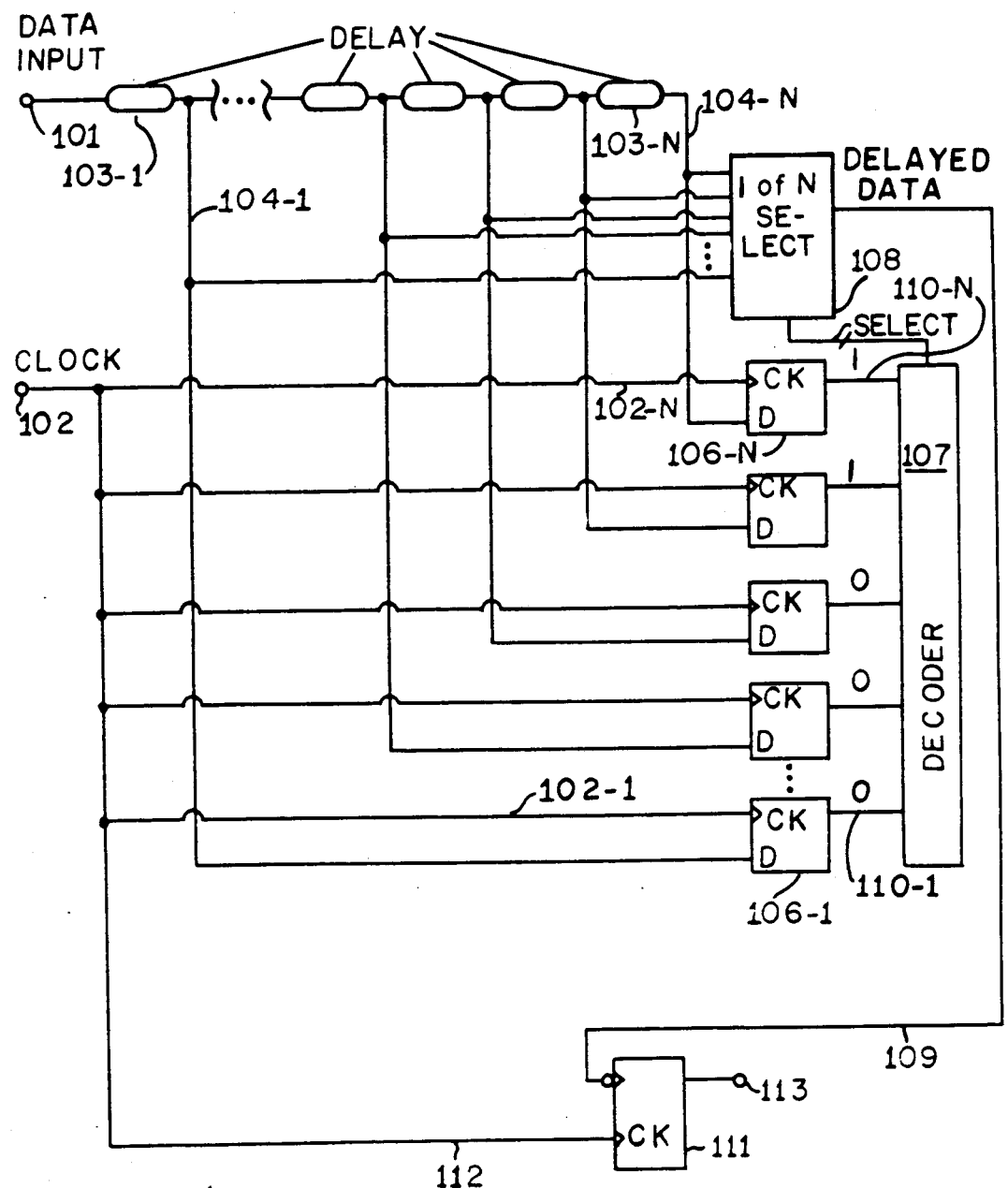
FIG. 1 is a schematic diagram of one embodiment of a digital phase synchronization circuit constructed in accordance with the teachings of this invention.

FIG. 1 is a schematic diagram of one embodiment of a digital phase synchronization circuit 00 constructed in accordance with the teachings of this invention. Circuit 100 includes data input terminal 101 which receives an input data stream such as that depicted in the timing diagram of FIG. 2. The input signal is applied in series to delay means 103-1 through 103-N for providing a plurality of N delayed input signals available on leads 104-1 through 104-N, respectively. Although the embodiment depicted in FIG. 1 depicts a plurality of delay means 103-1 through 03-N connected in series, in another embodiment of this invention a plurality of delay means are provided having their input leads connected in common to input terminal 101 and having various delay times, thereby providing a plurality of delayed input signals. In one embodiment of this invention, each delay means is conveniently constructed as an even number of inverters connected in series. In an alternative embodiment, the delay means are constructed utilizing phase lock loops, as is well known in the art, in order to provide a more highly controlled delay time than is provided with the use of inverters.

Figure 3:
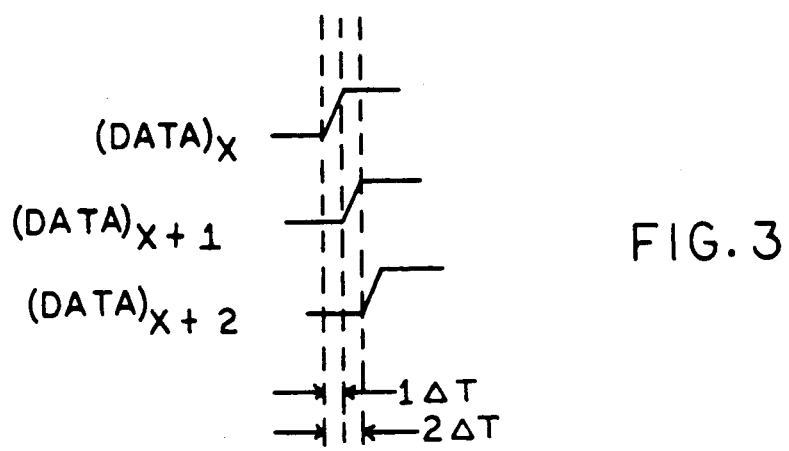
FIG. 3 is a set of waveforms depicting the phase relationships between the output signals of delay means 103-1 through 103-N of FIG. 1.

FIG. 3 is a timing diagram depicting the incremental phase shift provided by the plurality of delay means 103-1 through 103-N of FIG. 1. Thus, $(DATA)_x$ depicts, for example, the delayed data signal available on lead 104-1, $(DATA)_{x+1}$ depicts the phase relationship of the delayed data signal available on lead 104-2, and $(DATA)_{x+2}$ depicts the phase relationship of the delayed data signal available on lead 104-3. In this example of FIG. 3, delay elements 103-1 through 103-3 each provide a time delay of it. In alternate embodiments, these time delays provided by delay means 103-1 through 103-3 need not be equal.

In the embodiment of FIG. 1, delay means 103-1 through 103-N can all have substantially the same time delay, for example within the range of approximately 0.5 nanoseconds to 5 nanoseconds, or delay means 103-1 through 103-N can have various delay times, as desired.

Figure 2:
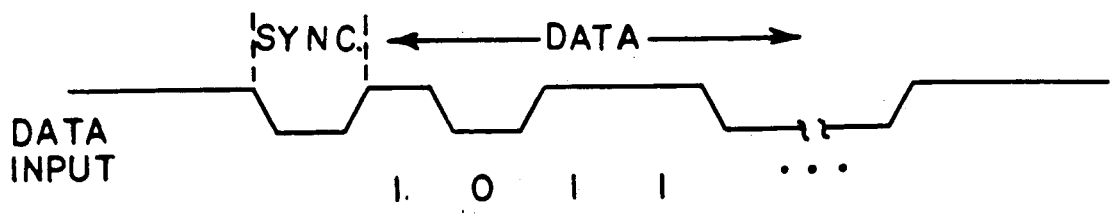
FIG. 2 is a waveform depicting input data applied to data input terminal 101 of FIG. 1.

In any event, a plurality of delayed input signals are available on leads 104-1 through 104-N which are each connected to the D input lead of an associated one of a plurality of D flip-flops 106-1 through 106-N, respectively. The clock input leads of D flip-flop 106-1 through 106-N are connected in common to clock input lead 102 which receives the receiver clock signal operating at the same frequency as the transmitter clock. When the sync bit of the received data signal, i.e. the first transition after a steady state period during which no data is transmitted, or following a predefined synchronization pattern, (as shown in FIG. 2), is received, the data pattern available on the output leads of D flip-flops 106-1 through 106-N is decoded by decoder 107 to determine which of the delayed input signals available on leads 104-1 through 104-N is most closely in phase with the receiver clock signal applied to clock lead 102.

Decoder 107 provides a selection word on bus 108 to one-of-N selector 105, which in turn selects the appropriate one of the plurality of delayed data signals available on leads 104-1 through 104-N. The selected delayed data signal is provided by one-of-N selector 105 via lead 109 to circuit 111. Circuit 111 comprises, for example, a storage element such as a RAM, a FIFO, a flip-flop, or a shift register, and serves to compensate for the differences between the incoming data speed and the outgoing data speed.

In one embodiment, the specific delay times need not be highly accurate and can be obtained by utilizing devices which do not necessarily provide highly consistent delay times from lot to lot, for example due to process variations, so long as the delay times are stable within an individual device. This is true because the selection of the delay times is made after fabrication of the device. Circuit 111 receives a clock signal from clock lead 102. When the clock is operating at twice the frequency of the input data, circuit 111 is clocked on the opposite edge of the clock signal as is D flip-flops 106-1 through 106-N. This ensures that the delayed data is sampled by circuit 111 in approximately the center of its period, as shown in the timing diagram of FIG. 4. Alternatively, in order to insure that a delay data is sampled by circuit 111 in approximately the center of its period, another delay element could be used. Such a delay element need not be highly precise, just so long as the input data is sampled in approximately the center of its period.

Figure 4:
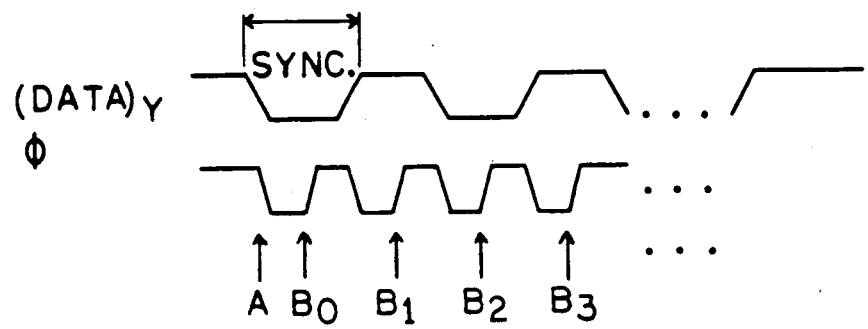
FIG. 4 is a set of waveforms depicting synchronization achieved in accordance with the teachings of this invention.

Referring to FIG. 4, a selected delayed input signal $(DATA)_y$ has a falling edge at point A of its sync pulse which is substantially in phase with the falling edge of the clock signal $\phi$. The rising edges of the clock signal $\phi$ is used to sample the $(DATA)_y$ signal at points B0, B1, B2, B3.... such that the $(DATA)_y$ signal is sampled in the approximate center of each data bit contained within the data stream.

Figure 5:
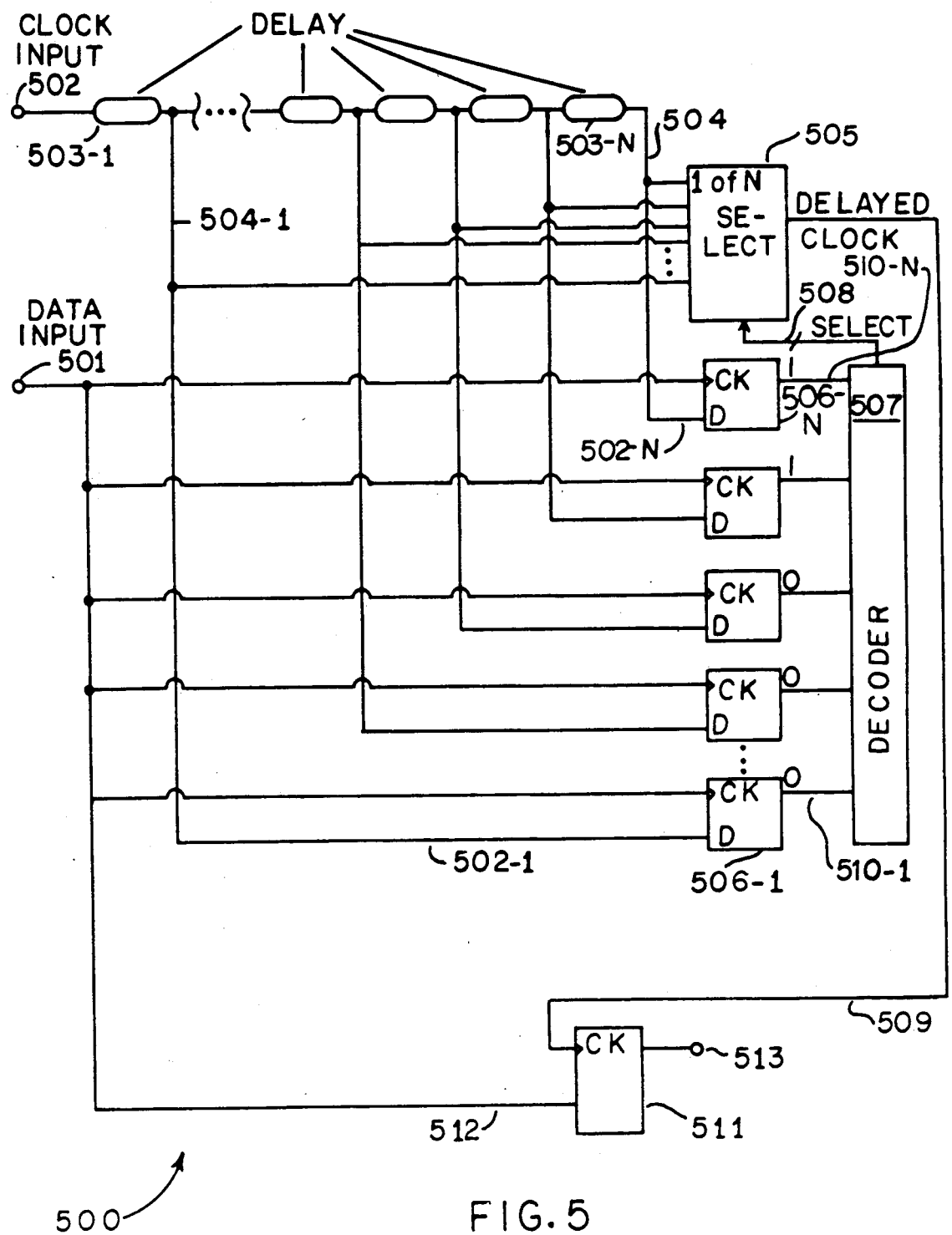
FIG. 5 is a schematic diagram of an alternative embodiment of a digital phase synchronization circuit constructed in accordance with the teachings of this invention.

In an alternative embodiment of this invention, as shown in FIG. 5, delay means 503-1 through 503-N serve to provide delayed versions of the clock signal applied to terminal 502, with the plurality of N delayed clock signals applied to associated ones of the plurality of N D flip-flops 506-1 through 506-N via leads 504-1 through 504-N, respectively. The data input signal applied to data input lead 501 is applied in common to all of the D input leads of D flip-flops 506-1 through 506-N. In this embodiment, the structure and method are substantially the same as described above with regard to the embodiment of FIG. 1, although it is the receiver clock signal which is delayed by the delay means and the appropriate one of the delayed clock signals is selected by one-of-N selector 505, rather than one of the delayed input signals, as is the case with the embodiment of FIG. 1.

Figure 6:
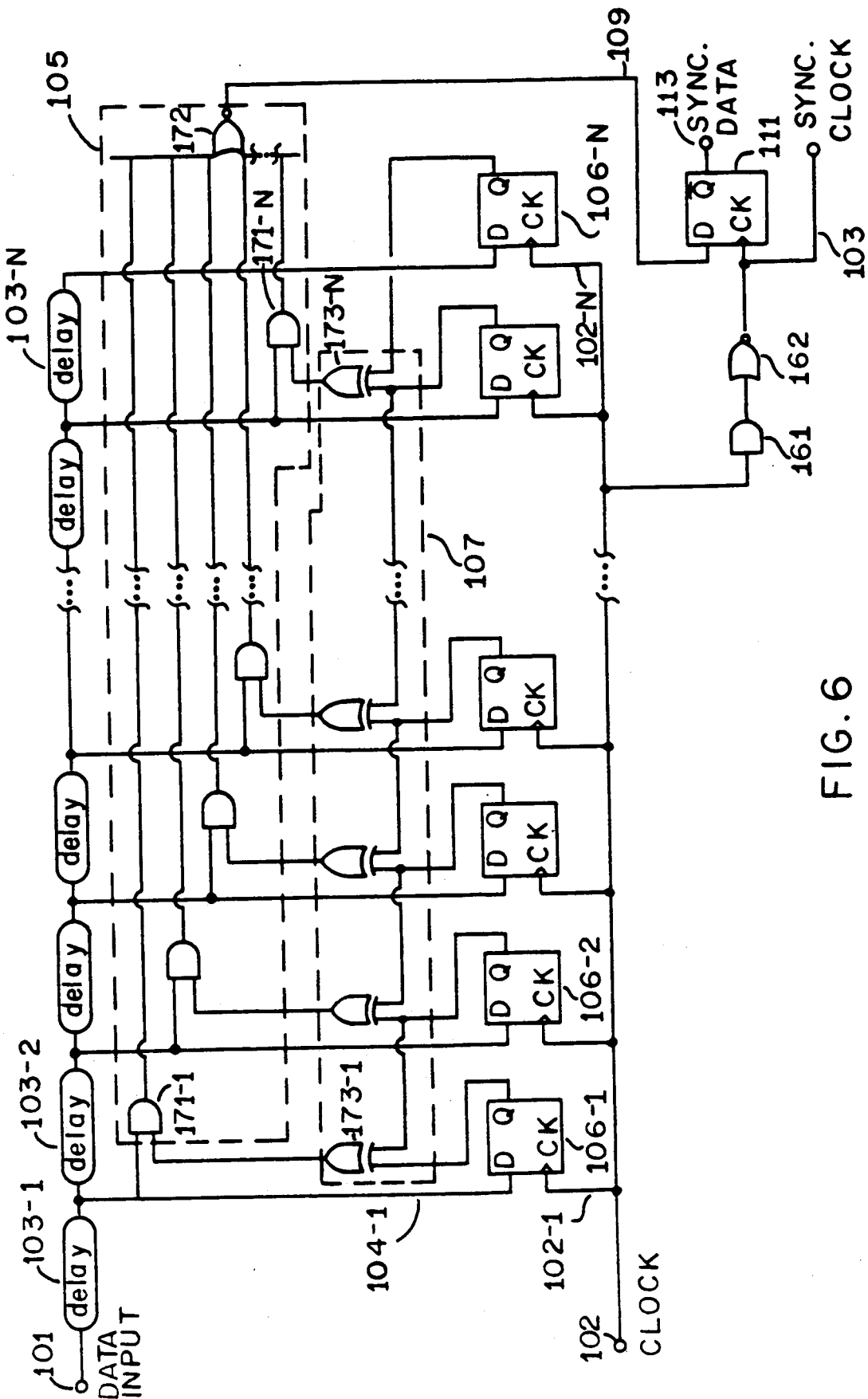
FIG. 6 is a diagram of an alternative embodiment of this invention showing circuitry suitable for use as decoder 107 and selector 105.

FIG. 6 is a schematic diagram of one embodiment of this invention similar to that shown in the schematic diagram of FIG. 1, but with the details of circuitry suitable for use as decoder 107 and selector 105 shown. In this embodiment, decoder 107 includes a plurality of exclusive OR gates 173-1 through 173-N, each exclusive OR gate 173-j having two input leads connected to the Q output leads of flip-flops 106-j and 106-j+1. In the embodiment shown in FIG. 6, selector 107 is formed of a plurality of AND gates 171-1 through 171-N, each AND gate 171-j having two input leads, a first connected to the output lead of delay means 103-j, and the second connected to the output lead of exclusive OR gate 173-j. The output leads of AND gates 171-1 through 171-N are connected to the input leads of NOR gate 172, whose output lead 109 serves as the delayed data selected by selector 105. Also shown in FIG. 6 are gates 161 and 162 which serve to add a propagation delay to the clock signal being applied to circuit 111, such additional delay being substantially equivalent to the propagation delay provided by the selected one of AND gates 171-1 through 171-N and NOR gate 172. Output lead 113 of circuit 111 provides synchronized data output, and lead 163 provides the synchronized clock signal for use by other circuitry (not shown).

Figure 7:
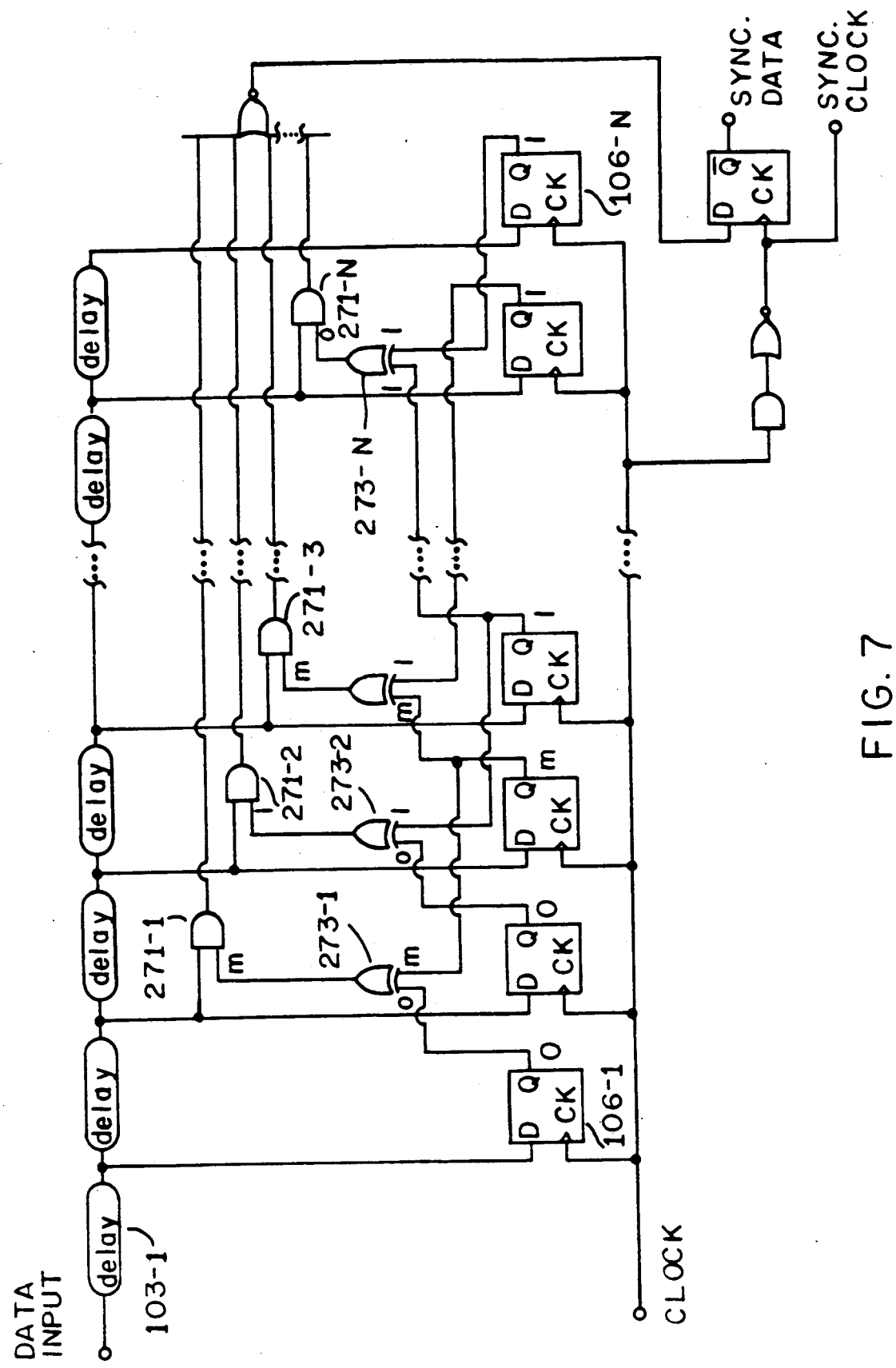
FIG. 7 is a schematic diagram of an alternative embodiment of this invention designed to minimize metastability problems.

FIG. 7 is a schematic diagram of an alternative embodiment of this invention similar to that of FIG. 6. The embodiment of FIG. 7 eliminates the possibility of a metastable condition except for a period of time equal to the delay of delay line 103-1, provided that the delay time of delay line 03-1 is greater than the set up and hold times of flip-flops 106-1 through 106-N. Metastability occurs in a flip flop when the set-up and hold times are violated. In the embodiment of FIG. 7, as long as the delay is greater than the set-up and hold time it is then possible for only one of the flip flops to be metastable at a time.

If the metastable condition occurs in the circuit of FIG. 7, one of the selections will be valid and two will be metastable ("M"). When the incoming data is a logical 0, the metastable condition M is masked by AND gates 271-1 through 271-N, as shown in FIG. 7. Conversely, when the incoming data is a logical 1, the metastable condition M is masked by OR gates 273-1 through 273-N. The only time the above conditions are not true is for a delay before and after the selected phase. This does not present a problem because the data is sampled on the opposite edge of the clock.

In an alternative embodiment of this invention, a plurality of delay lines and selection means is provided, one associated with the input data signal and one associated with the clock signal. In one such embodiment, a first of the delay lines and selection means serves as a coarse adjustment which can operate at moderate speeds and can easily be implemented utilizing CMOS devices. The second delay lines/selection means serves as a fine adjust and must operate at a significantly higher speed, and thus is implemented in ECL circuitry, for example.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A phase synchronization circuit comprising:
   an input port for receiving an input signal;
   a clock input lead for receiving an input signal;
   a plurality of N delay means, each having an associated time delay unrelated to said clock signal, each said delay means not having absolute accuracy requirements with respect to each other or with respect to said clock signal, for providing a plurality of delayed input signals in response to said input signal;
   a plurality of N phase detector means, each having an input lead connected to receive an associated one of said delayed input signals, a clock input lead for receiving said clock signal, and an output signal for providing an indication of the phase relation between its associated one of said delayed input signals and said clock signal;
   decoder means for receiving said output signals from said phase detector means and in response thereto determining which one of said delayed input signals has a desired phase relationship with said clock signal, said decoder means comprising a plurality of exclusive OR gates, each of said exclusive OR gates having a first input lead connected to receive the output signals of two of said phase detector means; and
   selector means for selecting said one of said delayed input signals which has said desired phase relationship with said clock signal.

2. A method as in claim 1 wherein said one of said delayed input signals which has said desired phase relationship with said clock signal is the one of said delayed input signals which is closest in phase to said clock signal.

3. A phase synchronization circuit as in claim 1 wherein said phase detector means each comprise a D flip flop.

4. A phase synchronization circuit as in claim 1 which further comprises detection means comprising a storage element.

5. A phase synchronization circuit as in claim 1 wherein said selector means comprises a 1 of N selector, where N is the number of delayed input signals.

6. A phase synchronization circuit as in claim 1 wherein said delay means are connected in series such that the delayed input signal provided by a selected one of said delay means is delayed by an amount equal to the sum of said selected delay means plus the delays provided by preceding delay means.

7. A phase synchronization circuit as in claim 6 wherein said plurality of delay means each provide approximately the same delay.

8. A phase synchronization circuit as in claim 6 wherein said plurality of delay means do not each provide approximately the same delay.

9. A method for phase synchronization comprising the steps of:
   receiving an input signal carrying data at a specified frequency;
   receiving a clock signal of said specified frequency;
   providing a plurality of delayed clock signals in response to said clock signal, each of said delayed clock signals being delayed from said clock signal by an associated period of time unrelated to said clock signal, said associated periods of time not having absolute accuracy requirements with respect to each other or with respect to said clock signal;
   selecting the one of said plurality of delayed clock signals that has a desired phase relationship with said input signal by using said selected delayed input signal to cause the approximate center of a data bit in said selected delayed input signal to correspond to a selected edge of said clock signal at which sampling of said data in said selected delayed input signal occurs; and
   using said selected one of said delayed clock signals to detect said data on said input signal.

10. A method as in claim 9 wherein said one of said delayed input signals which has said desired phase relationship with said clock signal is the one of said delayed input signals which is closest in phase to said clock signal.

11. A phase synchronization circuit comprising:
    an input port for receiving an input signal;
    a clock input lead for receiving a clock signal;
    a plurality of delay means, each having an associated time delay unrelated to said clock signal, each said delay means not having absolute accuracy requirements with respect to each other or with respect to said clock signal, for providing a plurality of delayed clock signals in response to said clock signal;
    a plurality of phase detector means, each having a clock input lead connected to receive an associated one of said delayed clock signals, an input lead for receiving said input signal, and an output signal for providing an indication of the phase relation between its associated one of said delayed clock signals and said input signal;
    decoder means for receiving said output signals from said phase detector means and in response thereto determining which one of said delayed clock signals has a desired phase relationship with said input signal, said decoder means comprising a plurality of exclusive OR gates, each of said exclusive OR gates having a first input lead connected to receive the output signals of two of said phase detector means; and selector means for selecting said one of said delayed clock signals as said desired phase relationship with said input signal.

12. A phase synchronization circuit as in claim 11 wherein said phase detector means each comprise a D flip flop.

13. A phase synchronization circuit as in claim 11 wherein said selector means comprises a 1 of N selector where N is the number of delayed clock signals.

14. A phase synchronization circuit as in claim 11 wherein said delay means are connected in series such that the delayed clock signal provided by a selected one of said delay means is delayed by an amount equal to the sum of said selected delay means plus the delays provided by preceding delay means.

15. A phase synchronization circuit as in claim 14 wherein said plurality of delay means each provide approximately the same delay.

16. A phase synchronization circuit as in claim 14 wherein said plurality of delay means do not each provide approximately the same delay.

17. A phase synchronization circuit as in claim 11 which further comprises detection means comprising a storage element.

18. A method for phase synchronization comprising the steps of:

receiving an input signal carrying data at a specified frequency;

providing a plurality of delayed input signals in response to said input signal, each of said delayed input signals being delayed from said input signal by an associated period of time unrelated to said specified frequency, said associated periods of time not having absolute accuracy requirements with respect to each other or to said specified frequency;

receiving a clock signal of said specified frequency;

selecting the one of said plurality of delayed input signals that has a desired phase relationship with said clock signal by using said selected delayed input signal to cause the approximate center of a data bit in said selected delayed input signal to correspond to a selected edge of said clock signal at which sampling of said data in said selected delayed input signal occurs; and using said selected one of said delayed input signals to detect said data on said input signal.

19. A method as in claim 18 wherein said one of said delayed input signals which has said desired phase relationship with said clock signal is the one of said delayed input signals which is closest in phase to said clock signal.

* * * * *